United States Patent [19]
Turner

[11] Patent Number: 6,141,329
[45] Date of Patent: Oct. 31, 2000

[54] DUAL-CHANNEL REAL-TIME COMMUNICATION

[75] Inventor: R. Brough Turner, Newton Corner, Mass.

[73] Assignee: Natural MicroSystems, Corporation, Framingham, Mass.

[21] Appl. No.: 08/984,006

[22] Filed: Dec. 3, 1997

[51] Int. Cl.[7] .......................... H04L 12/16; H04Q 11/00; H04N 9/74; H04N 7/12

[52] U.S. Cl. .......................... 370/261; 348/586; 348/388

[58] Field of Search ..................................... 348/388, 389, 348/423, 584, 585, 586, 12–21; 370/536, 542, 543–4, 464, 352, 353, 260, 261; 382/173, 176, 190, 195, 234, 304

[56] References Cited

U.S. PATENT DOCUMENTS

| | | | |
|---|---|---|---|
| 5,204,920 | 4/1993 | Moran et al. | 382/54 |
| 5,812,787 | 9/1998 | Astle | 395/200.77 |
| 5,953,350 | 9/1999 | Higgins | 370/524 |

*Primary Examiner*—Douglas W. Olms
*Assistant Examiner*—David R Vincent
*Attorney, Agent, or Firm*—Mintz, Levin, Cohn, Ferris, Glovsky and Popeo, P.C.

[57] ABSTRACT

A communication circuit includes a dual-channel coder having an unencoded data communication port, a first encoded data communication port, and a second encoded data communication port. The dual-channel coder is operative to translate between unencoded data at the unencoded communication port and corresponding encoded data at both the first encoded data port and at the second encoded data port The circuit further includes a real-time channel interface for connection to a real-time communication channel and operatively connected to the first encoded data tort of the coder. The real-time communication channel has a first latency of a guaranteed maximum for a data element to travel between ends of the real-time communication channel. The circuit further includes a best-efforts channel interface for connection to a best-efforts communication channel and operatively connected to the second encoded data port of the coder. The best efforts communication channel has a second latency with an allowable time for a data element to travel between ends of the best-efforts channel that is longer than the guaranteed maximum time.

28 Claims, 3 Drawing Sheets

DUAL-CHANNEL REAL-TIME COMMUNICATION

FIELD OF THE INVENTION

The present invention relates generally to the transmission of real-time or near-real-time information over a transmission medium.

BACKGROUND OF THE INVENTION

Various real-time voice and video signal coding methods have been developed. These have generally been designed to minimize the transmitted bit rate for a given level of quality of a signal. One type of coding method includes speaker-dependent speech coding algorithms, such as the method described by S. Roucous, R. Schwartz and J. Makhoul, in "A Segment Vocoder at 150B/S", Proceedings of the IEEE International Conference on Acoustics, Speech, and Signal Processing, Boston, Massachusetts, May, 1983, pps. 61–64, which is incorporated herein by reference. Video coding algorithms such as MPEG and ITU-T H.261 are also known in the art, and are used to minimize the data transmitted for a given level of quality.

SUMMARY OF THE INVENTION

In one general aspect, the invention features a communication circuit that includes a dual-channel coder having an unencoded data communication port, a first encoded data communication port, and a second encoded data communication port. The dual-channel coder is operative to translate between unencoded data at the unencoded communication port and corresponding encoded data at both the first encoded data port and at the second encoded data port. The circuit further includes a real-time channel interface for connection to a real-time communication channel and operatively connected to the first encoded data port of the coder, and a best-efforts channel interface for connection to a best-efforts communication channel and operatively connected to the second encoded data port of the coder. The best-efforts communication channel has at least one latency specification that is inferior to a corresponding latency specification of the real-time channel.

The real-time channel interface can be a telephone line interface operatively connected to a conventional circuit-switched telephone network and the best-efforts channel interface can be a network interface operatively connected to a global packet-based network. Both of the best-efforts channel and the real-time channel can be packet-based channels. The coder can be a speaker-dependent coder. The coder can include an encoder and further include a host processor operatively connected to the coder and a microphone operatively connected to the host processor. The coder can include a decoder and further include a host processor operatively connected to the coder and a speaker operatively connected to the host processor. The circuit can include a sequencing module and a transmission set-up module responsive to the sequencing module, where one of the real-time channel interface and the best-efforts channel interface is responsive to the sequencing module and wherein the sequencing module is operative to cause transmission set up tasks and transmission of static data to take place simultaneously. The coder and the best-efforts interface can be operative to transmit intermittently and the coder and the real-time interface can be operative to transmit continuously. The sequencing module can be operative to cause transmission set-up tasks to take place simultaneously with transmission of static data from the best-efforts data port. The coder can include a decoder and further include a video display responsive to the decoder. The circuit can include a video camera and the coder can include an encoder responsive to the video camera. A latency specification of the best-efforts channel can be above about 300 ms and a latency specification of the real-time channel can be below about 200 ms. A latency specification of the best-efforts channel can be above a perceptual boundary and a latency specification of the real-time channel can be below the perceptual boundary.

In another general aspect, the invention features a method of transmitting a signal that includes receiving a first component of a signal, receiving a second component of a signal, transmitting the first component to a receiver via a first transmission channel with a first latency specification, and transmitting the second component via a second transmission channel with a second latency specification, wherein the first and second transmission latency specifications are different. The step of transmitting the first component can include breaking the first component into packets, and the step of transmitting the second component can include transmitting the second component over a conventional circuit-switched telephone network. The step of transmitting the first component can include breaking the first component into packets and the step of transmitting the second component can include breaking the second component into packets.

According to a further general aspect, the invention features a method of transmitting a signal including dividing a signal into relatively static information and real-time or near-real-time information, transmitting the static information in advance of the real-time or near-real-time information, and transmitting the real-time or near-real-time information on a real-time data communications channel.

Systems according to the invention are advantageous in that they can optimize the use, latency time, and bandwidth of a real-time channel. Sending static set-up data during call set-up is beneficial because it allows a lower-bandwidth real-time channel to be employed for real-time or near-real-time forms of communication, such as telephone calls. And continuing to send static data through a best-efforts channel in parallel with data conveyed on a real-time channel may yield even further bandwidth reductions. If the cost savings from the bandwidth reductions on the real-time channel are significant in comparison with the cost to transmit the static data, calls can be made less expensively, more calls can be sent through a similar real-time channel, or both.

Systems according to the invention can also provide a degree of flexibility to a system that includes both real-time and best-efforts channels. Such systems can employ real-time channels in ordinary circumstances, and can then revert to a dual-channel mode in peak traffic situations, allowing the overall system to accommodate more calls. Once the peak is over, the systems can return to serving calls with real-time channels. Such systems may also reconfigure communication traffic in the case of damaged real-time lines. More aggressive coding can even be deployed in exceptional circumstances, allowing a larger number of calls to get through, albeit subject to some degradation.

Systems according to the invention can also provide telecommunications designers with flexible system design options. Designers can determine exactly what portions of the signal are important and configure a system to transmit them over a real-time channel and to send the remainder of the information over a best-efforts channel. Designers can even provide different mixes of real-time and best-efforts signals, allowing them to implement different capabilities for different applications, or to provide different types of services at different prices. Systems according to the invention can work with any coding method whose compressed output can be separated into relatively static information (e.g., information that changes every few seconds or even minutes) and dynamic information (e.g., information that changes multiple times per second).

DETAILED DESCRIPTION OF AN ILLUSTRATIVE EMBODIMENT

Figure 1:
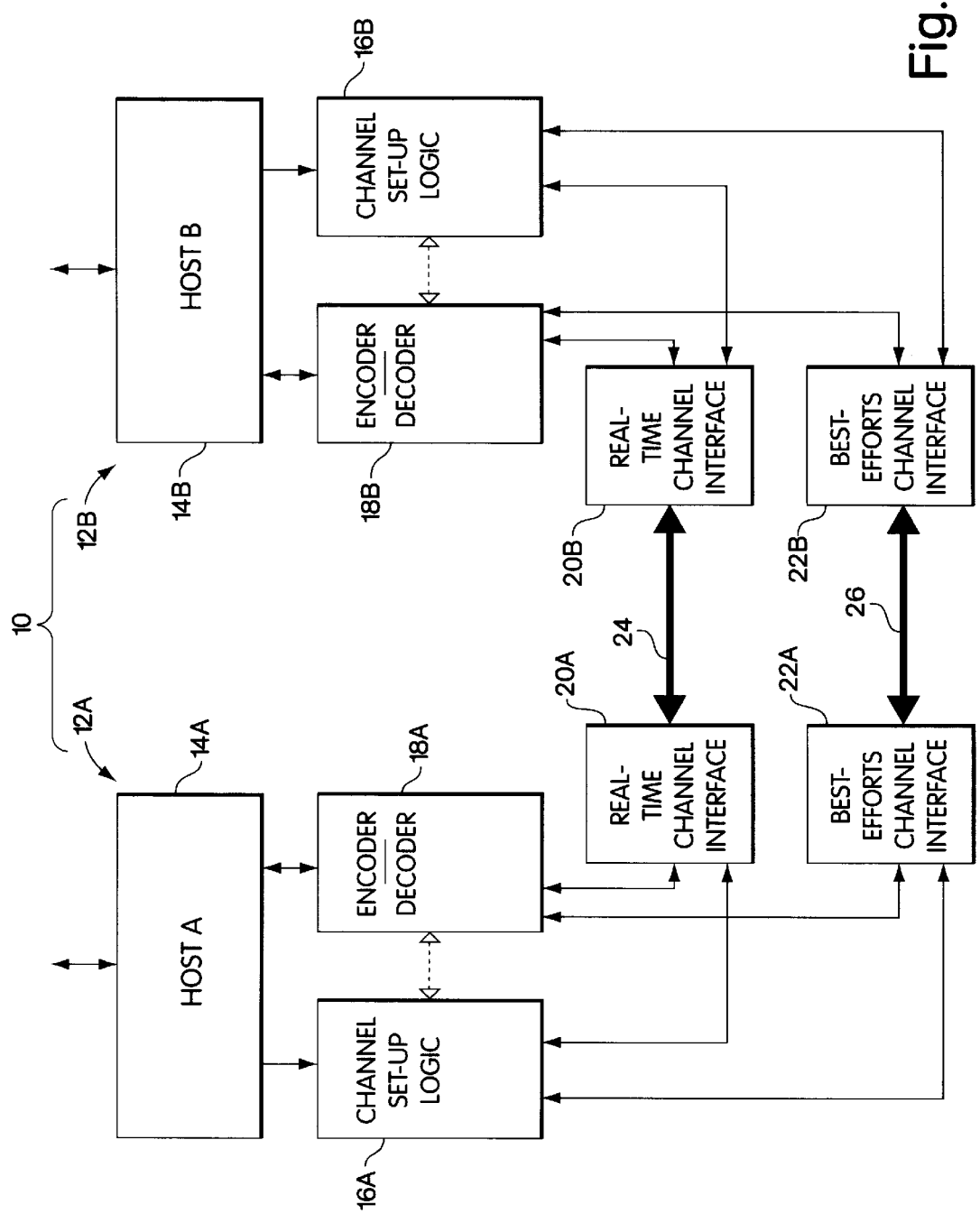
FIG. 1 is a block diagram of an illustrative full-duplex communication system according to the invention.

Referring to FIG. 1, an illustrative communication system 10 according to the invention includes a first communication station 12A and a second communication station 1 2B separated by a real-time channel 24 and a best-efforts channel 26. Each system includes a host 14A, 14B that has one or more control lines operatively connected to a channel setup logic module 1 6A, 16B. The hosts are also each operatively connected to an encoder/decoder 18A, 18B via a bidirectional data path. Each encoder/decoder has a real-time data port operatively connected to a real-time data port of a real-time channel interface 20A, 20B, and a bidirectional data port operatively connected to a best-efforts data port of a best-efforts channel interface 22A, 22B. The channel setup logic modules each have one or more control lines operatively connected to their respective real-time channel interface and to their respective best-efforts channel interface. The real-time channel interfaces both have a bidirectional data port operatively connected to the real-time channel. The best-efforts channel interfaces both have a bi-directional data port operatively connected to the best-efforts channel.

The system shown in FIG. 1 is broken down in a manner that is intended to illustrate its operation, but functions of the different blocks can be combined in ways that might appear to be physically different without departing from the spirit and scope of the invention. For example, although a separate encoder/decoder is shown in FIG. 1, the host itself might instead perform coding using a special-purpose software routine. Similarly, although the host in the configuration shown in FIG. 1 performs sequencing of various system tasks, a separate sequencer could also perform these tasks as could sequencing circuitry distributed among the remaining elements. And although the system illustrated in FIG. 1 is a full-duplex system, other implementations can employ simplex communications methods, with each station having either an encoder or a decoder and the channel interfaces being unidirectional. The various blocks of the system can be implemented using special-purpose hardware, software running on general purpose or special-purpose processors, or a combination of both.

The stations 12A, 12B can implement different types of communication systems. One application is audio communication between distant people (e.g., telephonic applications). In such systems, the host can include a processor, a microphone coupled to an analog-to-digital converter for digitizing sound received at the microphone, and a digital-to-analog converter that drives a speaker. The stations can also be used for other types of communication applications, such as video telephones, video broadcasting, surveillance systems, control systems, or telemetry systems. Such applications can employ other receiving and transmitting elements, such as video cameras, video monitors, or telemetry sensors.

Figure 2:
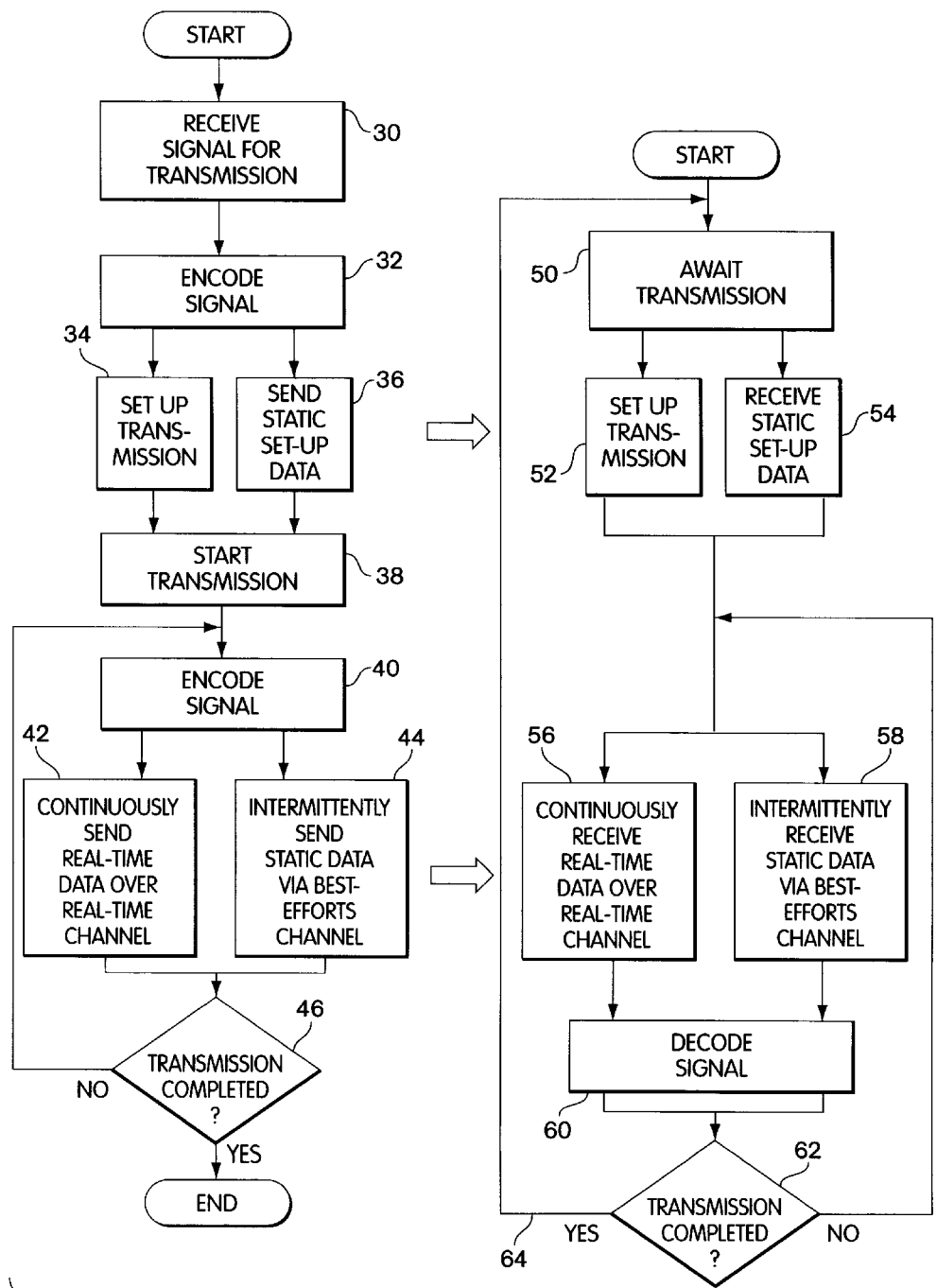
FIG. 2 is a flow chart illustrating half-duplex operation of the system of FIG. 1 with a first station acting as a transmitter and a second station acting as a receiver.

Referring to FIG. 2, operation of a transmitting portion of one of the stations 12A begins with a set-up phase. This phase can include receiving a portion of the signal for transmission (step 30) and encoding it (step 32) to derive static set-up data. During the set-up phase, the station also performs transmission set-up tasks (step 34), such as call switching, dialing, or handshaking, and sends static set-up data to the other station by providing the static set-up data to the best-efforts channel interface 22A (step 36). The transmitted set-up data may be acquired by the system during the set-up phase (e.g. room acoustics or the static background in a video scene), or they can be part of a predetermined, stored data set (e.g. speaker-dependent vocal tract characteristics or the body and facial characteristics of a video conference participant), in which case encoding need not take place during set-up. Note also that transmission set-up can begin before, after, or during encoding of the initial signal for transmission. Once the transmission has been set up and the static set-up data has been sent over the best-efforts channel, transmission can start (step 38).

During transmission, the signal is encoded into a real-time component and a static component (step 40). The sending station 12A continuously sends the real-time component over the real-time channel 24 by providing it to the real-time channel interface 28A (step 42), and either relies upon the static component sent at call setup, or intermittently sends the static component via the best-efforts channel 26 by providing it to the best-efforts channel interface 22A (step 44). This encoding and sending takes place until the transmission is completed (step 46).

On the other end of the communication channel, the receiving station 12B awaits transmission (step 50). As soon as it receives an indication that a transmission is being set up, it proceeds to assist in setting up the transmission (step 52), and to receive static set-up data (step 54). Once the receiving station has set itself up and received the static set-up data, transmission can begin.

During transmission, the receiving station 12B continuously receives real-time data from the real-time channel 24 through its real-time channel interface 20B. It also intermittently receives static data from the best-efforts channel 26 through its best-efforts channel interface 22B. Its decoder 18B then combines the real-time component with the static component to generate a decoded version of the transmitted signal. This operation continues until the transmission is complete (step 62), at which time the receiving station can again await transmission (branch 64).

Figure 3:
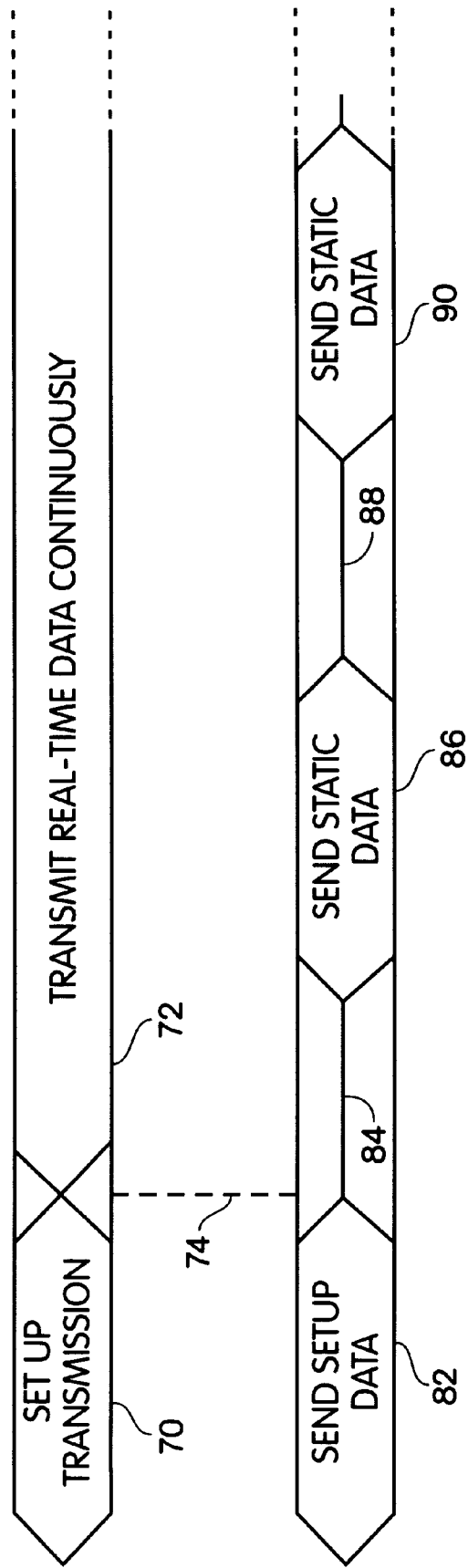
FIG. 3 is a timing diagram illustrating data flow during setup and transmission for the half-duplex operation illustrated in FIG. 2.

Referring to FIG. 3, the relative timing of the operation of the system of FIG. 1 will now be described in more detail. The transmitting real-time channel interface 20B begins by setting up transmission (70). When transmission is ready to begin (74), the transmitting real-time channel interface transmits a continuous, real-time data stream over the real-time channel interface 24.

The best-efforts channel interface 22A begins to transmit set-up data (82) during the transmission set-up phase, and when transmission on the real-time channel interface is ready to begin, it intermittently transmits static data (86, 90).

The static data can include periodic or aperiodic transmission bursts (86, 90) separated by lulls (84, 88). The bursts and lulls will generally be the result of intermittent transmission by the station, but they can also be due to break-up of a continuous transmission by the channel ("packetizing"). Note that the setup data can be provided over the real-time channel as well, before the transmission of real-time data begins.

The real-time channel 24 can be a Time-Domain Multiplexed (TDM) telephonic signal, such as a sub-rate telephone signal, or other low-latency channel. The real-time channel has a certain guaranteed maximum latency. For example, local land-based circuit-switched telephonic applications tend not to exceed 15 ms, while cellular telephonic latencies typically stay within 100 ms. The real-time channel can also be a packet-based channel with a certain guaranteed latency.

The best-efforts channel 26 can be a packet-switched channel, such as an internet connection. It will not exhibit the same maximum latency as the real-time channel; it may guarantee a higher maximum latency, it may guarantee an average latency, or it may make no particular guarantees at all. For example, internet channels can exhibit latencies between a few hundred ms to several seconds, although latencies can also fall outside this range. The real-time and best-efforts channels can each employ one or more of a variety of communication mediums, such as fiber optics, radio waves, or twisted pairs.

Latency differences that straddle the boundaries of perceptual ranges can be particularly beneficial because they allow the stations to employ channels that are not suitable for a certain type of communication to reduce the bandwidth of channels that are suitable for this type of communication. In telephonic channels, for example, callers begin to notice lags in conversational speech at latencies of around 200 ms and these become noticeable to most callers at latencies of about 300 ms (total microphone-to-speaker latency, including vocoding delays). Static channels that do not have, or are not guaranteed to have, a latency of under about 300 ms will therefore be able to reduce the bandwidth of real-time speech channels with latencies of below 200 ms, even if they cannot themselves be used for conversational speech.

Encoding methods for use with the communication system of FIG. 1 should be selected to provide coded output that can be separated into rapidly varying data as well as stable, or very slowly varying data. In the case of speech, a speaker-dependent speech coder can be used. This type of coder involves the transmission (or the previous knowledge of) a speaker-dependent code book for each speaker who is party to the conversation.

In a telephonic application, the stable output of the coder can be transmitted to the receiving end during the several-second-long call setup period before conversation begins. This initial data transmission of the stable output of the coder does not have to utilize the potential extra cost of a channel with a real-time quality of service. During the rest of the call, only the coder output which contains rapidly varying information need be sent to the receiving end over the potentially more expensive real-time channel.

A sample of background noise (e.g., "room tone") can be transmitted during the call setup in a telephonic application. During the actual conversation, only the information which consists of the speaker's changing voice would need to be sent over the real-time, high-cost channel to the receiving state. The background noise, and other slowly varying signals could be sent over a lower cost line to preserve bandwidth of the real-time channel.

Systems according to the invention may also send real-time video information. Many video coding schemes send the bulk of the information they handle in a differential format (e.g., frame or block updates), with complete frame updates being only sent relatively infrequently relative to the number of differential updates. Using such methods, transmitters according to the present invention can send differential frames over the low latency real-time channel, while occasionally sending complete frame updates over a low-cost best-efforts channel. By obtaining feedback from the receiving station, the transmitting station can dynamically adapt the rate of transmission of the complete frame updates to compensate for the behavior of the best efforts channel at any particular moment in time. Only the information that must be sent in real time, such as that required to maintain the appearance of a normal video conversation, need be sent over the real-time channel.

Video transmission methods can also break video images into slowly-moving and quickly-moving areas, or important and unimportant areas. For example, a speaker using a video telephone will generally be interested in watching the facial expression of the person he is conversing with, and will generally be less interested in the background behind that person. Systems according to the invention can therefore send the quickly-changing information relating to the person's facial expressions on the real-time channel, while reserving changes in the background for the best-efforts channel. The encoding schemes can be based on the rates of change in different parts of the image, or the image can be divided into high- and low-importance regions.

The foregoing discussion discloses and describes merely illustrative methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A communication circuit, comprising:

a dual-channel coder having an unencoded data communication port, a first encoded data communication port, and a second encoded data communication port, the dual-channel coder being operative to translate between unencoded data at the unencoded communication port and corresponding encoded data at both the first encoded data port and at the second encoded data port, a real-time channel interface for connection to a real-time communication channel and operatively connected to the first encoded data port of the coder, the real-time communication channel having a first latency of a guaranteed maximum time for a data element to travel between ends of the real-time communication channel, and a best-efforts channel interface for connection to a best-efforts communication channel and operatively connected to the second encoded data port of the coder, the best-efforts communication channel having a second latency with an allowable time for a data element to travel between ends of the best-efforts channel that is longer than the guaranteed maximum time.

2. The communication circuit of claim 1 wherein the real-time channel interface is a telephone line interface operatively connected to a conventional circuit-switched telephone network and wherein the best-efforts channel interface is a network interface operatively connected to a global packet-based network.

3. The communication circuit of claim 1 wherein both of the best-efforts channel and the real-time channel are packet-based channels.

4. The communication circuit of claim 1 wherein the coder is a speaker-dependent coder.

5. The communication circuit of claim 1 wherein the coder includes an encoder and further including a host processor operatively connected to the coder and a microphone operatively connected to the host processor.

6. The communication circuit of claim 5 wherein the coder includes a decoder and further including a host processor operatively connected to the coder and a speaker operatively connected to the host processor.

7. The communication circuit of claim 1 wherein the coder includes a decoder and further including a host processor operatively connected to the coder and a speaker operatively connected to the host processor.

8. A communication circuit comprising:
    a dual-channel coder having an unencoded data communication port, a first encoded data communication port, and a second encoded data communication port, the dual-channel coder being operative to translate between unencoded data at the unencoded communication port and corresponding encoded data at both the first encoded data port and at the second encoded data port,
    a real-time channel interface for connection to a real-time communication channel and operatively connected to t(he first encoded data port of the coder,
    a best-efforts channel interface for connection to a best-efforts communication channel and operatively connected to the second encoded data port of the coder, the best-efforts communication channel having at least one latency specification that is inferior to a corresponding latency specification of the real-time channel, and
    a sequencing module and a transmission set-up module responsive to the sequencing module, wherein one of the real-time channel interface and the best-efforts channel interface is responsive to the sequencing module and wherein the sequencing module is operative to cause transmission set up tasks and transmission of static data to take place simultaneously.

9. The system of claim 8 wherein the coder and the best-efforts interface are operative to transmit intermittently and the coder and the real-time interface are operative to transmit continuously.

10. The system of claim 8 wherein the sequencing module is operative to cause transmission set-up tasks to take place simultaneously with transmission of static data from the best-efforts data port.

11. The system of claim 1 wherein the coder and the best-efforts interface are operative to transmit intermittently and the coder and the real-time interface are operative to transmit continuously.

12. The system of claim 1 wherein the coder includes a decoder and further including a video display responsive to the decoder.

13. The system of claim 12 further including a video camera and wherein the coder includes an encoder responsive to the video camera.

14. The system of claim 1 further including a video camera and wherein the coder includes an encoder responsive to the video camera.

15. The system of claim 1 wherein a latency specification of the best-efforts channel is above about 300 ms and a latency specification of the real-time channel is below about 200 ms.

16. The system of claim 1 wherein a latency specification of the best-efforts channel is above a perceptual boundary and a latency specification of the real-time channel is below the perceptual boundary.

17. A method of transmitting a signal comprising:
    receiving a first component of a signal;
    receiving a second component of the signal;
    transmitting the first component to a receiver via a first transmission channel within a guaranteed first amount of time for a data element to traverse from one end of the first transmission channel to another end of the first transmnission channel; and
    transmitting the second component to a receiver via a second transmission channel within a guaranteed second amount of time for a data element to traverse from one end of the second transmission channel to another end of the second transmission channel, the second guaranteed amount of time being longer than the first amount of time.

18. The method of claim 17 wherein the latency specification of the first channel is below about 200 ms and the latency specification of the second channel is above about 300 ms.

19. The system of claim 17 wherein a latency specification of the first channel is below a perceptual boundary and a latency specification of the second channel is above the perceptual boundary.

20. The method of claim 17 wherein transmitting the second component includes breaking the second component into packets, and wherein transmitting the first component includes transmitting the first component over a conventional circuit-switched telephone network.

21. The method of claim 17 wherein transmitting the first component includes breaking the first component into packets and transmitting the second component include breaking the second component into packets.

22. A method of transmitting a signal comprising:
    dividing a signal into relatively static information and real-time or near-real-time information;
    transmitting the static information in advance of the real-time or near-real-time information; and
    transmitting the real-time or near-real-time information on a real-time data communications channel having a first specified guaranteed time in which a data element will be transmitted between ends of tile real-time data communications channel;
    wherein the static information is transmitted on a static information channel having a second specified guaranteed time in which a data element will be transmitted between ends of the static information channel, the second specified guaranteed time being longer than the first specified guaranteed time.

23. The method of claim 22 wherein the static information is transmitted over a best-efforts data communications channel.

24. The method of claim 23 wherein a latency specification of the best-efforts channel is above about 300 ms and a latency specification of the real-time channel is below about 200 ms.

25. The system of claim 23 wherein a latency specification of the best-efforts channel is above a perceptual boundary and a latency specification of the real-time channel is below the perceptual boundary.

26. The method of claim 22 wherein transmitting the static information includes breaking the static information into packets, and wherein transmitting the real-time or near-real-time information includes transmitting the real-time or near-real-time information over a conventional circuit-switched telephone network.

27. The method of claim 22 wherein transmitting the static information and transmitting the real-time or near-real-time information both include breaking the static information and the real-time or near-real-time information into packets.

28. The communication circuit of claim 1 wherein the second latency is a guaranteed maximum amount of time for data to travel between ends of the best-efforts channel.

* * * * *

UNITED STATES PATENT AND TRADEMARK OFFICE
CERTIFICATE OF CORRECTION

PATENT NO. : 6,141,329
DATED : October 31, 2000
INVENTOR(S) : R. Brough Turner

It is certified that error appears in the above-identified patent and that said Letters Patent is hereby corrected as shown below:

Abstract, line 10, "tort" should read --port--.

Abstract, line 12, "maximum for" should read --maximum time for--.

Claim 21, column 8, line 40 "include" should read "includes--.

Signed and Sealed this

Eighth Day of May, 2001

Attest:

NICHOLAS P. GODICI

Attesting Officer
Acting Director of the United States Patent and Trademark Office

UNITED STATES PATENT AND TRADEMARK OFFICE
CERTIFICATE OF CORRECTION

PATENT NO. : 6,141,329
DATED : October 31, 2000
INVENTOR(S) : R. Brough Turner

It is certified that error appears in the above-identified patent and that said Letters Patent is hereby corrected as shown below:

Title page,
Under " References Cited", the following references are missing:

Under "U.S. Patent Documents", please insert :
-- 5,610,910    3/1997    Focsaneanu et al. ...............370/351 --

Under "Foreign Patent Documents", please insert:
-- 0 765068 A2   3/97   European Pat. Off.   H04M   15/00
   0 801479 A1   10/97  European Pat Off..   H04L   9/32 --

Under "Other Publications", please insert:
-- Koenen, Rob, Editor, " Coding of Moving Pictures and Audio," International Organisation for Standardisation, ISO/IEC JTC1/SC29/WG11 N1730, Stockholm, July 1997, pgs. 1-31.
Roucos, S., et al., "A Segment Vocoder at 150 B/S," ICASSP 83. Boston, IEEE, Bolt Beranek and Newman, Inc., Cambridge, MA, 1983, Chpt. 2.1, pgs. 61-64. "Another Technological Mirage: Resource Reservation Considered Harmful," http://www.pluris.com/ip_vs_atm/reserv.html, page 1; August 15, 1997.
"Scale-Free Imaging Description: Extensions for Scaleable Video," http://tvot.www.media.mit.edu/projects/TVOT/Agenda95-2/sfi.html, page. 9; April 20, 1997.
MPEG-4 requirements ver. 2.0, "http://drogo.cselt.stet.it/mpeg/documents/mpeg-4_requirements.htm, page 20; April 18, 1997. --

Signed and Sealed this

Twenty-third Day of October, 2001

*Attest:*

*Attesting Officer*

NICHOLAS P. GODICI
*Acting Director of the United States Patent and Trademark Office*